Nov. 3, 1953     L. F. BENTLEY     2,657,601
INSULATION STRIPPING DEVICE
Filed March 29, 1950
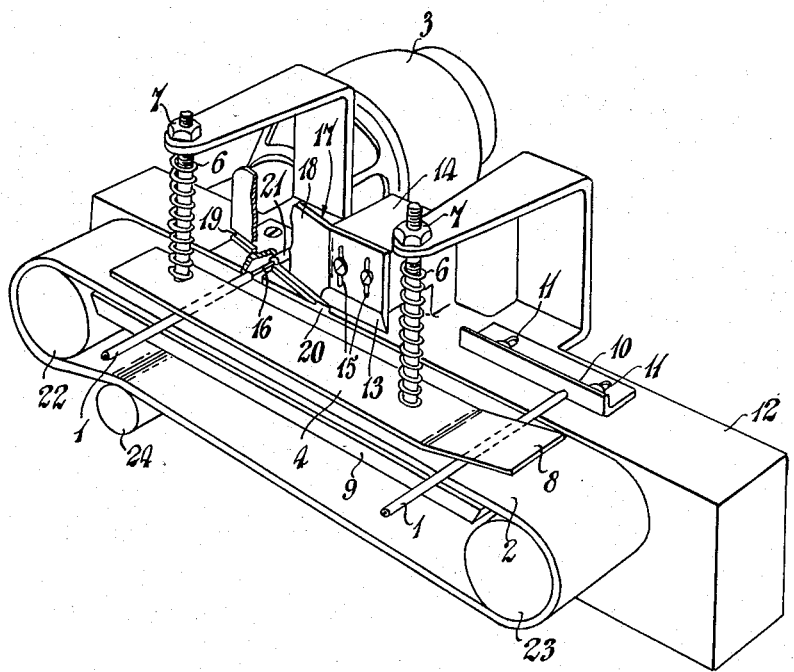
Inventor
LESLIE FIRTH BENTLEY Patented Nov. 3, 1953

2,657,601

UNITED STATES PATENT OFFICE 2,657,601

INSULATION STRIPPING DEVICE

Leslie F. Bentley, Cambridge, England, assignor to Pye Limited, Cambridge, England, a British company Application March 29, 1950, Serial No. 152,643

Claims priority, application Great Britain March 31, 1949

3 Claims. (Cl. 81—9.51)

The present invention relates to an apparatus for stripping the insulation from the end of an insulated electric wire, and more particularly for stripping the rubber or like insulating sheath from multi-strand flexible cables.

The present invention consists in an apparatus for stripping the insulation from the end of an insulated electric wire, wherein the insulated wire is rotated against a cutting blade to cut through the insulation at the position from which the stripping is to commence, and the wire is thereafter moved sideways through the apparatus, preferably whilst still being rotated, relative to a stripping device which engages the end portion of the insulation to be stripped and moves the latter endwise with respect to the wire and thereby strips it from the wire.

Preferably the stripping device comprises a member in alignment with or forming a continuation of the cutting blade, which member moves into the groove cut in the insulating sheath as the wire is moved sideways through the apparatus, the side of said member facing the end of the wire being inclined away from the direction of travel of the wire so as to push the severed end of the insulation, by engaging on the cut end wall thereof, towards and off of the end of the wire. Preferably, the stripping device comprises a pair of members as described which engage in diametrically opposite parts of the groove cut in the insulation, the pair of members defining a slot of a width corresponding approximately to the outside diameter of the conducting core. As the insulated wire is moved sideways through the slot, the severed end of the insulation is forced by the members defining the slot, which members are inclined away from the direction of movement of the insulated wire, towards and off the end of the conducting core.

The insulated wire is preferably continuously rotated as it is moved sideways past the cutting blade and the stripping device. This rotation may be effected by feeding the wires through the apparatus between fixed and moving surfaces which frictionally engage diametrically opposite parts of the wire, the wires rotating between the two surfaces as they are moved by the moving surface relative to the fixed surface.

Rotating the wire in the case of stripping multi-strand cables or flexibles has the advantage that, due to the stripping device preventing or tending to prevent the rotation of the severed end of the insulation, the strands forming the stripped end of the wire will be twisted together.

One embodiment of an apparatus according to this invention is illustrated in the accompanying drawing, which is a somewhat schematic perspective view. The wires to be stripped 1, after being cut to the required length, are fed through the machine by an endless belt 2 supported by two pulleys 22 and 23 and driven by a convenient motor 3, the belt moving parallel with a pressure plate 4 of metal or other rigid material, which is loaded by springs 6 and is preferably adjustable stop means 7 being provided for normally holding the plate 4 at a distance from the belt 2 slightly less than the overall diameter of the insulated wire 1 to be stripped. The feed-in end 8 of the pressure plate 4 may be inclined away from the surface of the belt, and the belt 2 may be supported, opposite the plate 4, by passing over a rigid supporting surface 9. The tension of the belt may be varied by means of a tensioning pulley 24.

The wires 1 are placed transversely on the belt 2 with their ends to be stripped projecting beyond one side of the belt by a distance corresponding to the length of the insulation to be stripped. This length may be determined by a stop wall 10, which may be secured by adjustable means 11 to the frame 12 of the apparatus at the side of the belt 2. As the wires 1 move sideways through the space between the belt and the pressure plate 4, they are caused to rotate. Whilst rotating, the ends of the wires are moved past a knife-edge cutting blade 13 which cuts a groove around the insulation at the place to which the wire is to be stripped. This blade is carried from the frame of the apparatus, for example by means of a block 14, on which it is adjustably secured at 15 so that the insulating sheath only, and not the conducting core 16 of the wire, will be cut.

The blade is made from strip metal arranged edgewise above the path along which the wires move. The first or blade part of the strip 17 is arranged parallel with the edge of the belt 2, whilst the trailing or stripping part 18 of the strip 17 (of which the bottom edge need not be sharpened) is curved or inclined away from the edge of the belt. Carried by the apparatus frame 12 directly beneath and in alignment with the stripping part 18 of the strip 17 is a member 19 which is of the same width as the strip 17 and defines therewith a slot of a width corresponding approximately to the diameter of the conducting core of the wire. The leading edge 20 of this member 19 is chamfered so that it will lead the member into the groove cut into the insulation. The side surfaces of the strip and member which are remote from the belt, bear on the end wall of the severed insulation 21 and push the severed end of the insulation off from the end of the conducting core 16 as the wire continues its sideways movement, whilst still being rotated between the belt and pressure plate, past the stripping device. The stripped wires, with the strands of the conducting core twisted together, are ejected from the apparatus after they have moved out from the space between the belt 2 and the pressure plate 4.

Whilst a particular embodiment has been described, it will be understood that various modifications may be made without departing from the spirit of the invention.

I claim:

1. Apparatus for stripping the insulation from the end of an insulated wire, comprising a stationary cutting blade, means for advancing and simultaneously rotating an insulated wire against said blade to cut a groove in the insulation at the position from which the stripping is to commence, said advancing means also moving said wire beyond the blade after the insulation has been cut, and a stripping member located beyond said blade with respect to the path of movement of the wire, said stripping member having a portion inclined away from said blade and from the advancing means, and the end of the stripping member adjacent the cutting blade being aligned therewith and located to engage in said cut groove as the advancing means moves said wire beyond said blade, whereby the portion of insulation to be stripped is removed as a complete tube during further onward movement of the wire by said advancing means.

2. Apparatus as claimed in claim 1, comprising a second stripping member disposed in opposition to said first stripping member, said first and second stripping members thereby engaging in diametrically opposite parts of the said cut groove in the insulation, said pair of members defining a slot of a width corresponding frictionally to the outside diameter of the conducting core.

3. Apparatus for stripping the insulation from the end of insulated wires, comprising a stationary cutting blade, means for rotating a wire against said blade for cutting through the insulation at the position from which the stripping is to commence and for moving the wire sideways under continued rotation after the insulation has been cut, said means including fixed and moving surfaces arranged frictionally to engage diametrically opposite parts of said wire whereby said wire is rotated between said two surfaces as it is moved by said moving surface relative to said fixed surface, and a stripping member located beyond said blade with respect to the path of movement of the wire, said stripping member having a portion inclined away from said blade, and the end of the stripping member adjacent the cutting blade being aligned therewith and located for engagement in said cut groove in the end portion of the insulation to be stripped whereby the cut-off end of the insulation is moved off the end of the wire in the form of a tube while said wire is being moved sideways by said means.

LESLIE F. BENTLEY.

References Cited in the file of this patent

UNITED STATES PATENTS

| Number | Name | Date |
| --- | --- | --- |
| 1,131,473 | Courtney | Mar. 9, 1915 |
| 1,165,176 | Hornor | Dec. 21, 1915 |
| 1,722,087 | Hartman | July 23, 1929 |
| 2,313,793 | Wood | Mar. 16, 1943 |
| 2,394,174 | Hessler | Feb. 5, 1946 |